US010229516B2

(12) United States Patent
Aben et al.

(10) Patent No.: US 10,229,516 B2
(45) Date of Patent: Mar. 12, 2019

(54) METHOD AND APPARATUS TO IMPROVE A 3D + TIME RECONSTRUCTION

(71) Applicant: Pie Medical Imaging B.V., Maastricht (NL)

(72) Inventors: Jean-Paul Aben, Limbricht (NL); Mark Punt, Maastricht (NL); Gerardo Dibildox Ramos, Rotterdam (NL); Theodores van Walsum, Houten (NL); Rianne Reinartz, Neerbeek (NL)

(73) Assignee: Pie Medical Imaging B.V., Maastricht (NL)

( * ) Notice: Subject to any disclaimer, the term of this patent is extended or adjusted under 35 U.S.C. 154(b) by 101 days.

(21) Appl. No.: 15/219,040

(22) Filed: Jul. 25, 2016

(65) Prior Publication Data

US 2017/0039736 A1     Feb. 9, 2017

(30) Foreign Application Priority Data

Aug. 4, 2015 (EP) ..................................... 15179724

(51) Int. Cl.
*G06T 11/00* (2006.01)
*G06T 7/55* (2017.01)
*G06T 17/10* (2006.01)

(52) U.S. Cl.
CPC .............. *G06T 11/003* (2013.01); *G06T 7/55* (2017.01); *G06T 17/10* (2013.01); *G06T 2207/10081* (2013.01); *G06T 2207/10116* (2013.01); *G06T 2207/30101* (2013.01)

(58) Field of Classification Search
None
See application file for complete search history.

(56) References Cited

U.S. PATENT DOCUMENTS

| 2007/0270689 | A1* | 11/2007 | Lothert | ................ | A61B 6/032 |
| | | | | | 600/428 |
| 2009/0141968 | A1* | 6/2009 | Sun | ..................... | G06T 7/55 |
| | | | | | 382/154 |
| 2011/0002517 | A1* | 1/2011 | Mollus | ................... | G06T 17/00 |
| | | | | | 382/130 |
| 2011/0182492 | A1* | 7/2011 | Grass | ..................... | A61B 6/4441 |
| | | | | | 382/131 |

(Continued)

OTHER PUBLICATIONS

Respiratory Motion Estimation in X-Ray Angiography for Improved Guidance During Coronary Interventions, Baka N et al, Physics in Medicine and Biology, Institute of Physics Publishing, Bristol, GB, vol. 60, No. 9, Apr. 10, 2015, pp. 3617-3637, XP020283585.

(Continued)

*Primary Examiner* — Andrew G Yang
(74) *Attorney, Agent, or Firm* — Gordon & Jacobson, P.C.

(57) ABSTRACT

A method for making a three-dimensional surface reconstruction of an object from two or more bi-dimensional images of the object, so called 2D images, comprising:
a) providing a three-dimensional dataset, so called 3D dataset, of the object;
b) generating a 3D model using the dataset as described in a);
c) providing motion information to build a 3D model over time;
d) generating a 3D reconstruction from said at least two 2D images; and
e) using information from the 3D model over time to correct the 3D reconstruction over time.
A corresponding apparatus and computer program are also disclosed and claimed.

23 Claims, 8 Drawing Sheets

(56) References Cited

U.S. PATENT DOCUMENTS

| | | | | |
|---|---|---|---|---|
| 2012/0293498 A1* | 11/2012 | Schormans | ............. | G06T 19/00 345/419 |
| 2014/0015836 A1* | 1/2014 | Neubauer | ............. | G06T 11/008 345/427 |
| 2015/0091563 A1* | 4/2015 | Lu | ........................ | A61B 5/055 324/309 |

OTHER PUBLICATIONS

"3-D Reconstruction of Coronary Arterial Tree to Optimize Angiographic Visualization", James Chen S et al; IEEE Service Center, Piscataway, NJ, vol. 19, No. 4, Apr. 1, 2000, XP011035955.

"3D/3D Registration of Coronary CTA and Bigplane XA Reconstructions for Improved Image Guidance", Gerardo Dibildox et al.; Medical Physics., vol. 41, No. 9, Sep. 1, 2014, p. 091909, XP055249219.

"A Review Paper of 3D Surface Reconstruction of Coronary Arteries from Cardiovascular Angiography", Hasan H. Khaleel et al, Advanced Computer Science Applications and Technologies (ACSAT) 2012 International Conference on, IEEE, Nov. 26, 2012, pp. 419-435, XP032401639.

* cited by examiner

METHOD AND APPARATUS TO IMPROVE A 3D + TIME RECONSTRUCTION

CROSS-REFERENCE TO RELATED APPLICATIONS

The present application claims priority from EP Patent Appl. No. 15179724.8, filed on Aug. 4, 2015, herein incorporated by reference in its entirety.

BACKGROUND

1. Field

The present application relates to a method and apparatus for improving a 3D+time reconstruction based on X-ray angiography using non-invasive 3D imaging modalities.

2. State of the Art

Angiography is a commonly used imaging modality within a numerous variety of interventions. During such interventions it is very important that the clinician gets a good understanding of the object in question. For example, in vascular interventions it is important that the clinician has all information concerning the part of the vessel tree of interest. This is necessary when, for instance, a stent is to be placed in a bifurcated vessel, where a bifurcated vessel is a main artery or vein that has split up into two or more further arteries or veins.

Two dimensional angiographic imaging, such as X-ray, frequently lacks the possibility to visualize the bifurcation region correctly. Especially the carina position of the bifurcation, which is defined as the point where the vessel splits, is a challenge to visualize correctly with two dimensional angiographic imaging because of overlap of one or more of the vessel segments connected to the bifurcation.

If the physician bases his or her decision on incomplete or imprecise information about this bifurcated tubular shaped object, this can have severe consequences. For instance, an obstruction at the bifurcation can be missed or underestimated or the wrong stent dimension can be selected. This can lead to serious complications for the patient.

In practice interventional treatment is generally performed under guidance of 2D images acquired with angiographic X-ray systems of the so-called C-arm or L-arm type. These systems allow acquisition of 2D images from different directions, also called 2D perspectives, of the object under examination. These different perspectives can be obtained by rotating the arm holding the X-ray source and the image intensifier around the patient.

Making a 3D reconstruction from 2D images acquired in at least two different perspectives is done frequently, however there remains some uncertainty also in the 3D reconstruction on the exact shape of the vessel around the bifurcation due to overlap in the 2D images used to make a 3D reconstruction of the bifurcated vessel.

An example of the problems with overlap is visualized in FIG. 1. Only the last image shows the true shape of the bifurcation resulting in a proper visualization of the carina.

For the 3D reconstruction it is therefore important that the 2D angiographic images are taken from a right perspective. In the case of angiographic systems, the right perspective is defined as the angulations of an X-ray system (both the system rotation and angulation) that contains as much information as possible. In this perspective foreshortening and overlap of surrounding vessels should be minimized.

Foreshortening is the event when an object seems compressed when viewed from a certain perspective, causing distortion in the information.

When dealing with complex vessels such as the left coronary artery, overlap with other vessels can occur as seen in FIG. 2. Because these branches can be of the same coronary artery and for instance bifurcate after the admission point of the contrast, the appearance can be drawn that a section of interest contains contrast. This can lead to a missed or underestimated obstruction in the section of interest.

To be able to cope with this misinterpretation, the clinician needs to have a good understanding of the entire coronary tree. However, with X-ray angiography it is not possible to reconstruct the entire coronary artery tree using two 2D angiographic images. This is due to the field of view (FOV) of the X-ray modality as seen in FIG. 3 and the contrast wash out.

Also when dealing with for instance coronary arteries, multiple bifurcations can exist in a segment of interest. These bifurcations each have a different orientation. Therefore, it is almost impossible to visualize every bifurcation region correctly using X-ray.

A further aspect that needs to be taken into account is the movement of the coronary tree during a heart cycle. This movement can for instance be caused by the motion of the heart itself but also by the breathing of the patient. During these movements, different sections of the coronary tree move relative to each other. This movement can cause overlap of vessels in the chosen 2D perspectives in certain stages of the heart cycle and makes understanding the coronary tree at a given time an even more complex task.

In current practice movement of the vessels of interest during angiography is determined during continuous contrast admission throughout multiple heart cycles, which allows the clinician to follow the movement of the coronary arteries in X-ray angiographic images. This is a large burden for the patient. Of these continuous recordings multiple 3D reconstructions can be made. However, to obtain the optimal amount of information for these 3D reconstructions, each reconstruction needs to be made using optimal projections. In practice this is however not feasible. Therefore, most of these reconstructions are made using one or more perspectives that is optimal for one moment in time. This can cause discontinuities between the 3D reconstructions.

An alternative for making various separate 3D reconstructions is the propagation of the 3D reconstruction in the time domain (4D) as taught by Chen et al, "Kinematic and Deformation Analysis of 4-D Coronary Arterial Trees Reconstructed From Cine Angiograms", IEEE Transactions on medical imaging, Vol. 22, No. 6, June 2003 pp 710-721 and Zheng et al, "Sequential reconstruction of vessel skeletons from X-ray coronary angiographic sequences", Computerized Medical Imaging and Graphics 34 (2010) 333-345. However, the information that can be gathered using this approach is limited due to the aforementioned limitations of X-ray such as FOV, overlap and the presence of multiple bifurcations. A way to acquire information regarding multiple bifurcations without undistinguishable overlap is through volumetric images acquired with CT or MR systems.

However, these imaging acquisition systems cannot be used during interventions. Also CT recordings are single phase recordings, including only one heart phase per recording. Furthermore, the spatial resolution and/or temporal resolution of CT and MR imaging modalities is significantly lower than of X-ray angiography.

Therefore, the 3D imaging modalities by themselves are not applicable nor sufficient to obtain all information needed during the intervention, they do however contain important information regarding bifurcations, overlap and diseased segments.

Furthermore, data obtained earlier on from a 3D imaging modalities can be used to guide a clinician during an intervention for instance for vessel matching.

Baka, at al presented a method for guidance during coronary intervention on a monoplane x-ray system, "Respiratory motion estimation in x-ray angiography for improved guidance during coronary interventions", Physics in Medicine & Biology, 60 (2015) 316-3637. The described method is based on retrieving of the 3D coronary artery centerline from pre-interventional 3D CT images. To achieve the improved guidance, a framework is presented for registration of the 3D centerlines with the monoplane X-ray image sequences in which the patient specific cardiac and respiratory motion is learned. Although the method uses 3D coronary centerline reconstructions obtained by pre-interventional 3D CT imaging and monoplane X-ray angiography to learn the motion within this specific X-ray angiographic image perspective, the method is restricted to guidance within this specific X-ray angiographic image perspective. During coronary interventions is common practice that the physician uses multiple perspectives of the X-ray system (angulating, rotating the X-ray system) to obtain a desired perspective of the object of interest, which significantly limits the clinical application of this solution.

SUMMARY

It is thus an object to provide an improved method for an accurate a 3D reconstruction from bi-dimensional images to solve, at least partially, the above drawbacks.

In accordance with embodiments herein, systems, computer program products and computer implemented methods are provided for making a three-dimensional surface reconstruction of an object from two or more bi-dimensional images of the object, the systems, program products and methods comprising, under control of one or more computer systems configured with specific executable instructions:

a) providing a three-dimensional dataset, so called 3D dataset, of the object;
b) generating a 3D model using the dataset as described in a);
c) providing motion information to build a 3D model over time;
d) generating a 3D reconstruction from said at least two 2D images; and
e) using information from the 3D model over time to correct the 3D reconstruction over time.

The idea is to use information gathered from a 3D+time dataset, such as, a CT, to allow an improved 3D+time reconstruction, for example to assist in vessel matching during an intervention.

An embodiment relates to a computer product directly loadable into the memory of a digital computer and comprising software code portions for performing the operations according to embodiments herein when the product is run on a computer and to an X-ray imaging device for acquiring two dimensional images. The device comprises a module for obtaining a least two images of a vessel tree or part of a vessel tree from different perspectives, input for receiving a 3D or 4D dataset of the tree and a processing unit programmed for performing the operations of the method according to embodiments herein.

Another embodiment relates to an X-ray angiography apparatus comprising the X-ray imaging device and a unit configured for processing the 3D or 4D dataset to determine rotational and angulation position of such imaging device to acquire 2D images from optimal perspectives to make an optimal 3D reconstruction of the tree.

Further improvements will be described and claimed.

BRIEF DESCRIPTION OF THE DRAWINGS

The characteristics of the present disclosure and the advantages derived therefrom will be more apparent from the following description of non-limiting embodiments illustrated in the annexed drawings.

FIG. 6a shows a color map in terms of foreshortening, overlap of surrounding vessels and in-plane coronary motion for one heart phase; and FIG. 6b shows a color map in terms of foreshortening, overlap of surrounding vessels and in-plane coronary motion including several heart phases.

DETAILED DESCRIPTION OF THE PREFERRED EMBODIMENTS

Figure 4:
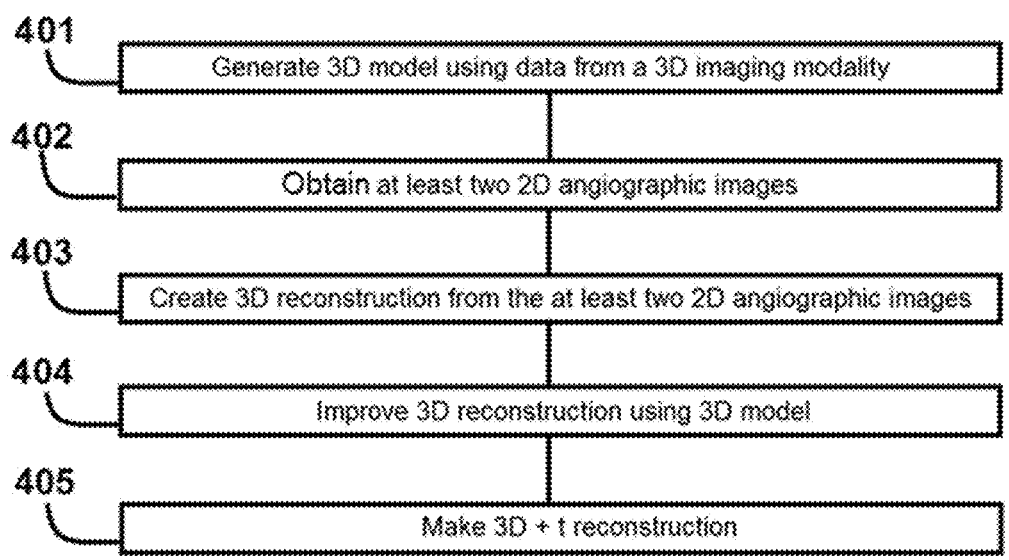
FIG. 4 shows a flowchart according to embodiments herein.

FIG. 4 shows a flow chart illustrating the operations according to an embodiment of the present application. The operations employ an imaging system capable of acquiring and processing two-dimensional images of a vessel organ (or portion thereof) or other object of interest. For example, a single plane or bi-plane angiographic system can be used such as those manufactured, for example, by Siemens (Artis zee Biplane) or Philips (Allura Xper FD).

Figure 8:
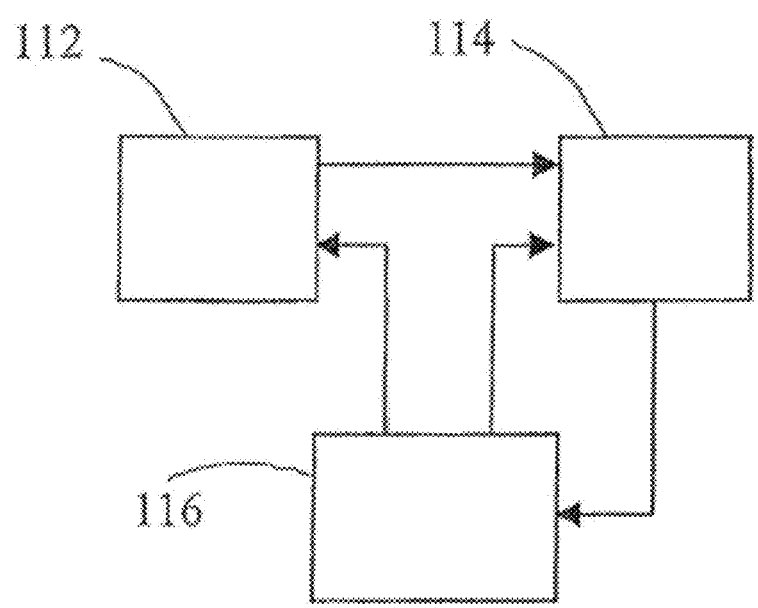
FIG. 8 shows a functional block diagram of an exemplary single plane angiographic system.

FIG. 8 is a functional block diagram of an exemplary single plane angiographic system, which includes an angiographic imaging apparatus 112 that operates under commands from user interface module 116 and will provide data to data processing module 114. The single plane angiographic imaging apparatus 112 captures a two-dimensional X-ray image of the vessel organ of interest for example in the postero-anterior (PA) direction. The single plane angiographic imaging apparatus 112 typically includes an X-ray source and detector pair mounted on an arm of a supporting gantry. The gantry provides for positioning the arm of the X-ray source and detector at various angles with respect to a patient who is supported on a table between the X-ray source and detector. The data processing module 114 may be realized by a personal computer, workstation or other computer processing system. The data processing module 114 processes the two-dimensional image captured by the single plane angiographic imaging apparatus 112 to generate data as described herein. The user interface module 116 interacts with the user and communicates with the data processing module 114. The user interface module 116 can include different kinds of input and output devices, such as a display screen for visual output, a touch screen for touch input, a mouse pointer or other pointing device for input, a microphone for speech input, a speaker for audio output, a keyboard and/or keypad for input, etc. The data processing module 114 and the user interface module 116 cooperate to carry out the operations of FIG. 12 as described below.

The operations of FIG. 4 can also be carried out by software code that is embodied in a computer product (for example, an optical disc or other form of persistent memory such as a USB drive or a network server). The software code can be directly loadable into the memory of a data processing system for carrying out the operations of FIG. 4. Such data processing system can also be physically separated from the angiographic system used for acquiring the images making use of any type of data communication for getting such images as input.

At 401, the data processing module 114 generates a 3D model of (a large portion of) the coronary tree. This is done using data acquired from a 3D imaging modality, for instance CT. This can be done manually, for instance by indicating the vessel centerlines, or automatically as taught for instance by Lesage et al, "Bayesian Maximal Paths for Coronary Artery Segmentation from 3D CT Angiograms", MICCAI 2009, Part 1, LNCS 5761, pp 222-229, herein incorporated by reference in its entirety. The data obviously cannot be acquired during the intervention. Therefore, this data needs to be available when starting the intervention, for instance on a server. This 3D model will be used later on to improve a 3D reconstruction made using at least two 2D angiographic images and facilitate the propagation of this 3D reconstruction over time.

To be able to make a 3D reconstruction of the section of interest during the intervention, at 402 the data processing module obtains at least two 2D angiographic images. This can be done by either acquiring or using already acquired images. A 2D angiographic image is a recording of multiple frames during a heart cycle from a certain perspective. For the 3D reconstruction, it is important that the 2D angiographic images are taken from a right perspective. In the case of angiographic systems, the right perspective is defined as the angulations of an X-ray system (both the system rotation and angulation) that contains as much information regarding the segment of interest as possible. In this perspective foreshortening and overlap of surrounding vessels should be minimized.

Foreshortening is the event when an object seems compressed when viewed from a certain perspective, causing distortion in the information. The perspectives in which an object of interest are visualized with minimum foreshortening are called optimal perspectives as taught by Dumay et al, "Determination of optimal angiographic viewing angles: basic principles and evaluation study", IEEE Trans. Med. Imaging, Vol 13, Number 1, March 1994, herein incorporated by reference in its entirety.

In a preferred embodiment the available data from the 3D imaging modality is used by the data processing module to suggest at least two optimal perspectives to the user in terms of foreshortening and overlap of surrounding vessels. Of this 3D model the orientation is known relative to the X-ray system. An optimal perspective in terms of minimal foreshortening is determined as a perspective that is perpendicular to the orientation of the 3D model or a section thereof. Because the model can be looked at from different angles that are all perpendicular to it, a various amount of optimal perspectives is possible.

However, an optimal perspective is not solely dependent on minimizing foreshortening but also on overlap of surrounding vessels. Therefore, a measure for this overlap is also taken into account. The overlap of surrounding vessels can be for one or multiple heart phases because due to movement, either of the heart itself or breathing motion, surrounding vessels can overlap the segment of interest during a certain time moment.

The 3D model extracted from the CT data is back projected onto a 2D plane representing a certain perspective as taught by Lay, "Linear algebra and its applications", 2012, 4th edition, p142-143, Addison-Wesley Longman, herein incorporated by reference in its entirety. For every centerline point of each vessel in the 3D model, a certain diameter is known. This diameter can for instance be derived from literature as described in Dodge et al, "Lumen diameter of normal human coronary arteries: influence of age, sex, anatomic variation, and left ventricular hypertrophy or dilation", Circulation, 1992: 82: 232-246, herein incorporated by reference in its entirety, the actual 3D lumen model or a fixed value. Every point that is within the vessel of interest in the 3D model, is assigned a certain value. For every 3D point, its value is added to the corresponding 2D point in the back projected image.

The plane with the maximum amount of 2D points containing a value, is the most desirable perspective in terms of minimal overlap.

Additionally, for instance for use during the intervention, a perspective can be indicated in terms of minimal in-plane coronary motion. This perspective shows the vessel of interest with the least amount of in-plane coronary motion in the perspective. This allows the clinician to view the vessel of interest in a position where the vessel is as still as possible.

A measure for the amount of in-plane coronary motion for each perspective can be determined for instance by back projecting the 3D model extracted from the CT data onto a 2D plane representing a certain perspective as taught by Lay, "Linear algebra and its applications", 2012, 4th edition, p142-143, Addison-Wesley Longman. For every centerline point of each vessel in the 3D model, a position is known. Then the 3D model extracted from CT data can be deformed using the motion model as taught by Baka et al, "3D+t/2D+t CTA-XA registration using population-based motion estimates", Demirci, Lee, Radeva, Unal (eds): MICCAI-STENT 2012, pp 64-71, herein incorporated by reference in its entirety, to yield a 3D model at a different time moment. This deformed 3D model is then also back projected onto a 2D plane representing the certain perspective. Again the position of each centerline point is known but now for a different moment in time.

For every centerline point the in-plane coronary motion can be determined by comparing the positions of each centerline point in both back-projections.

The plane with the minimum amount of in-plane movement for all centerline points, is the most desirable perspective in terms of minimal in-plane coronary motion. This can be done for one or multiple heart phases.

Then for every combination of angulation and rotation (thus each perspective), it can be indicated how optimal the resulting perspective is. This indication is for instance a weighted sum of foreshortening, overlap of surrounding vessels and/or in-plane coronary motion for at least one heart phase.

When multiple heart phases are taken into account, the calculations are done for each time moment that is for each frame. A weighted sum of all frames within the multiple heart phases is then made to obtain an overall indication of how optimal the perspectives are.

Figure 6A:
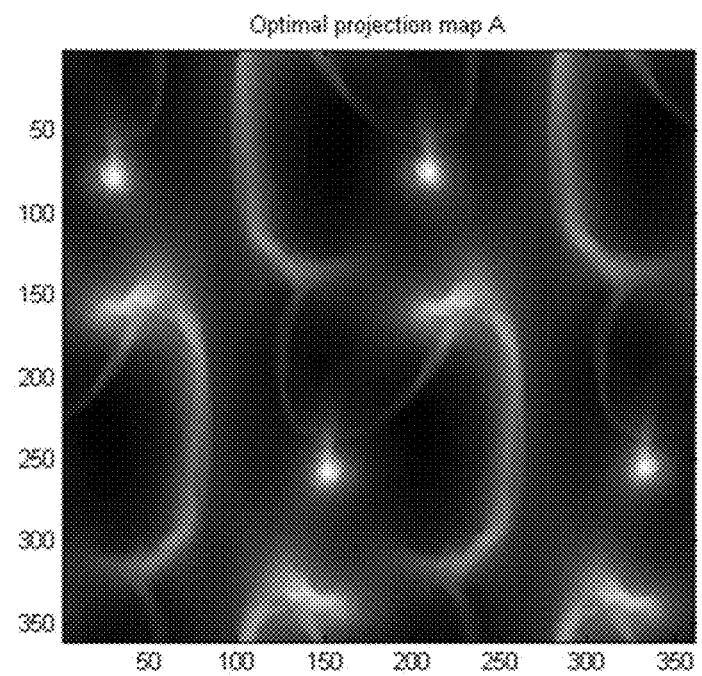
FIGS. 6a and 6b show an example of a color map used to indicate optimal projections.
Figure 6B:
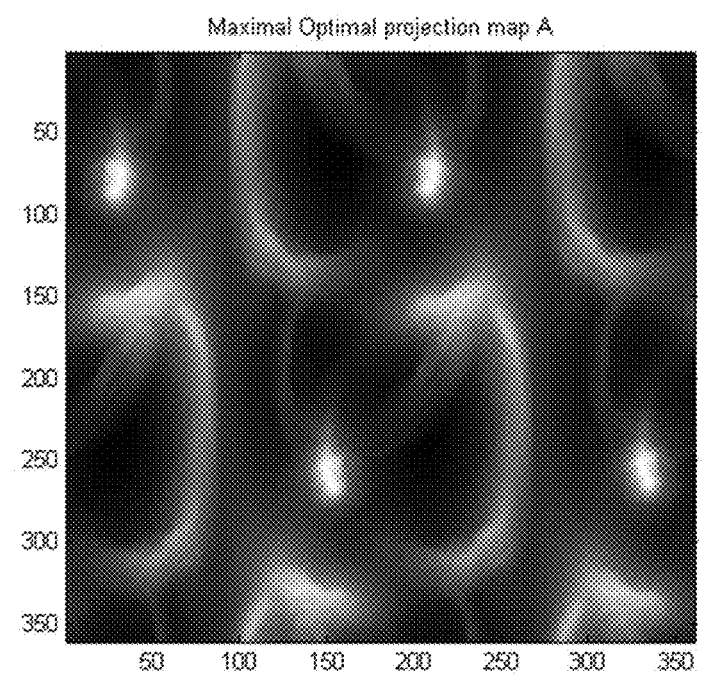

This can be visualized for instance using a color map as shown in FIG. 6. FIG. 6*a* shows a color map in terms of foreshortening, overlap and in-plane coronary motion of surrounding vessels for one heart phase whereas FIG. 6*b* shows a color map in terms of foreshortening, overlap of surrounding vessels and in-plane coronary motion including multiple heart phases.

Using this outcome the user can select a perspective from which the 2D angiographic images can be acquired.

The information regarding the first perspective can then be used to make a suggestion for the next 2D angiographic image that is to be acquired. Certain sections for instance that suffer from foreshortening and/or overlap in the previous one or more 2D angiographic images need to be optimally visible in the next 2D angiographic image. Also, additionally the fact that the maximum amount of information for a 3D reconstruction is available when two perspectives are orthogonal to each other and/or limitations in the range of the used imaging modality can be taken into account. These limitations can for instance be due to the fact that a C-arm can only rotate and/or angulate a certain amount of degrees and is therefore not able to achieve one or multiple perspectives.

Using the at least two acquired 2D angiographic images, at 403 the data processing module makes a 3D reconstruction.

For this, the vessel of interest needs to be indicated in the images. This can be done manually by indicating the centerline of the vessel of interest in both images or detect (semi-) automatically the centerline in both images.

In a preferred embodiment the 3D model made from the CT data can be used to guide the user in indicating the vessel of interest in the second 2D angiographic image.

To do this a match has to be established between the 3D model and the second 2D angiographic image. First the 3D model is positioned such that the patient orientation is equal to the second 2D angiographic image, as well as the viewing perspective. Preferably also the heart phase of the second 2D angiographic image is matched to that of the 3D model. Using the suggested optimal perspectives, the best information available can be used to register the 3D imaging data and the 2D angiographic image.

The CT data is recorded during one heart phase, whereas the 2D angiographic image contains multiple heart phases. Aligning the heart phase ensures a better matching.

The 3D model is then back projected onto the second 2D angiographic image as taught by for instance Lay, "Linear algebra and its applications", 2012, 4th edition, p142-143, Addison-Wesley Longman. This can be done using a 3D centerline model or a 3D lumen model.

To simplify the matching of the back projected 3D model to the second 2D angiographic image, the lumen in the second 2D angiographic image is emphasized. This can be performed using a vesselness filter which takes into account the diameters of the lumen that need to be found in the image, for instance Frangi, "Multiscale vessel enhancement filtering", In Medical Image Computing and Computer-Assisted Intervention—MICCAI 1998, Lecture Notes in Computer Science, Vol 1496 pp 130-137, herein incorporated by reference in its entirety. These diameters can be retrieved directly from the 3D model in case of a lumen-model. When only the centerline is extracted an educated guess of the corresponding diameters can be made using literature about the diameters Dodge et al, "Lumen diameter of normal human coronary arteries: influence of age, sex, anatomic variation, and left ventricular hypertrophy or dilation", Circulation, 1992: 82: 232-246, herein incorporated by reference in its entirety. This results in a 2D vesselness image.

The matching between the 2D vesselness image and the back projected 3D model is performed by calculating the costs of the mismatch between the back projected 3D centerline model and the 2D vesselness centerlines. For every back projected 3D point, a cost is determined. This cost is for instance the Euclidian distance to the nearest-neighbor point. The total cost for the match between this back projected 3D centerline model and the 2D vesselness image is a summation of the cost for all points of the back projected 3D centerline model.

The minimum cost represents the best match between the back projected 3D model and the second 2D angiographic image. Using this match, the vessel of interest can for instance be highlighted in the second 2D angiographic image, therefore guiding the clinician through vessel matching.

Another option is that the 3D centerline model obtained from the CT data is back-projected onto both 2D angiographic images. In this case the indication of the vessel of interest is performed automatically.

An advantage of applying the 3D model on multiple perspectives is that all knowledge about the 3D space is taken into consideration and cost information can be shared between perspectives to facilitate the matching process.

When the perspectives are not recorded at exactly the same time, an asynchronous matching can also be calculated as taught for instance by Sarry et al, "Three-Dimensional Tracking of Coronary Arteries From Biplane Angiographic Sequences Using Parametrically Deformable Models", IEEE Transactions on Medical Imaging, Vol. 20, No 12, December 2001, herein incorporated by reference in its entirety.

Once the segment of interest is known in at least two 2D angiographic images, a 3D reconstruction can be made. This can be done as taught for instance by Onuma et al, "A novel dedicated 3-dimensional quantitative coronary analysis methodology for bifurcation lesions", EuroIntervention 2011; 6: 1-00, herein incorporated by reference in its entirety.

The resulting 3D reconstruction obtains all information available from the 2D angiographic images. However, even when the perspectives chosen for the 2D angiographic images are optimal in terms of foreshortening and overlap of surrounding vessels, this is not a guarantee that absolutely no overlap will occur. Especially when a vessel of interest contains multiple bifurcations, not every bifurcation will be viewed optimally.

To account for this, at 404 the data processing module uses the 3D model of the CT data to improve the 3D reconstruction.

When viewing the 3D model in the same orientation and perspective as the 2D angiographic images, it is known in which regions overlap occurs. These regions are of great significance hence these regions are improvement areas for the 3D reconstruction.

Figure 1:
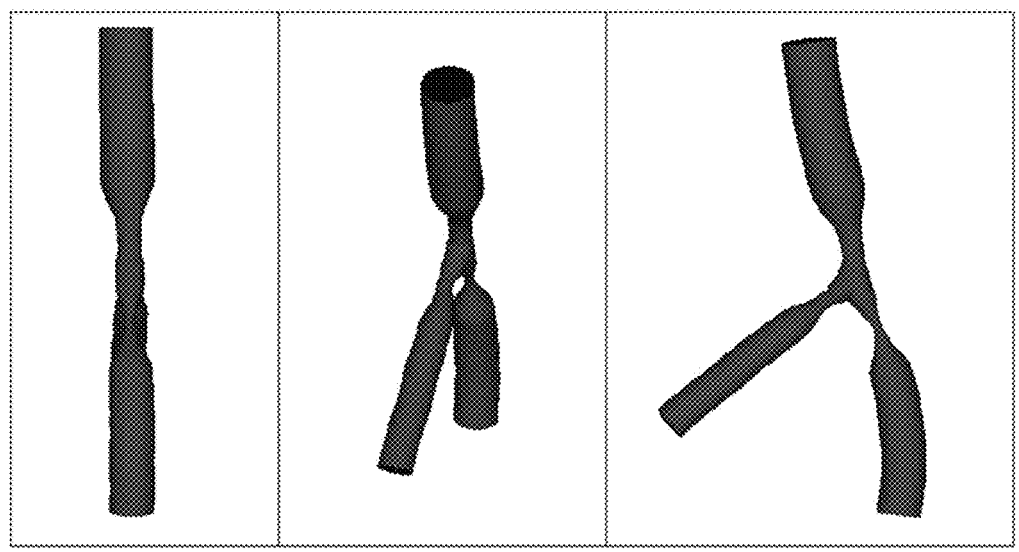
FIG. 1 shows a bifurcation viewed from different directions.
Figure 2:
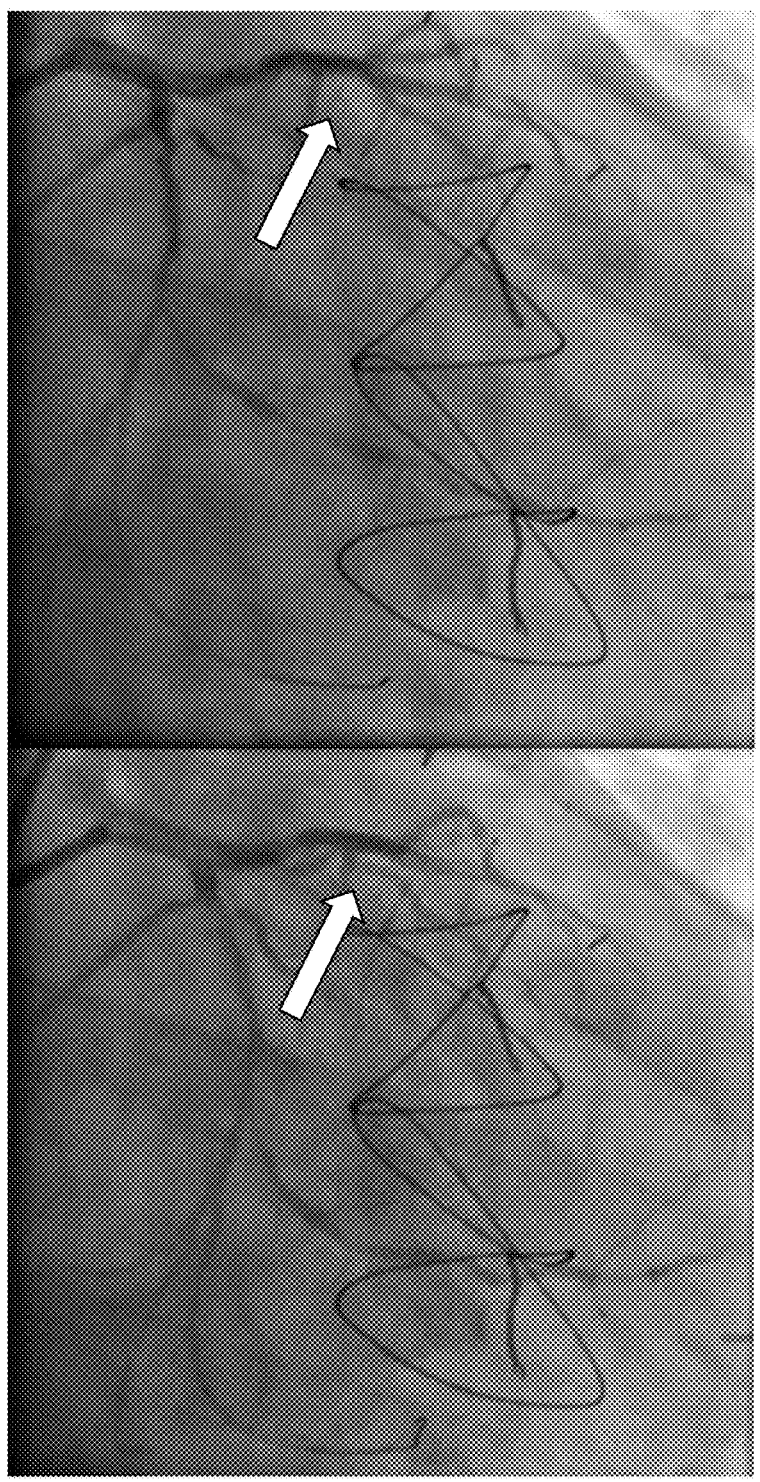
FIG. 2 shows the complex structure of the left coronary vessel, in the top image overlap occurs while in the bottom image the same branch does not overlap due to a different perspective.
Figure 3:
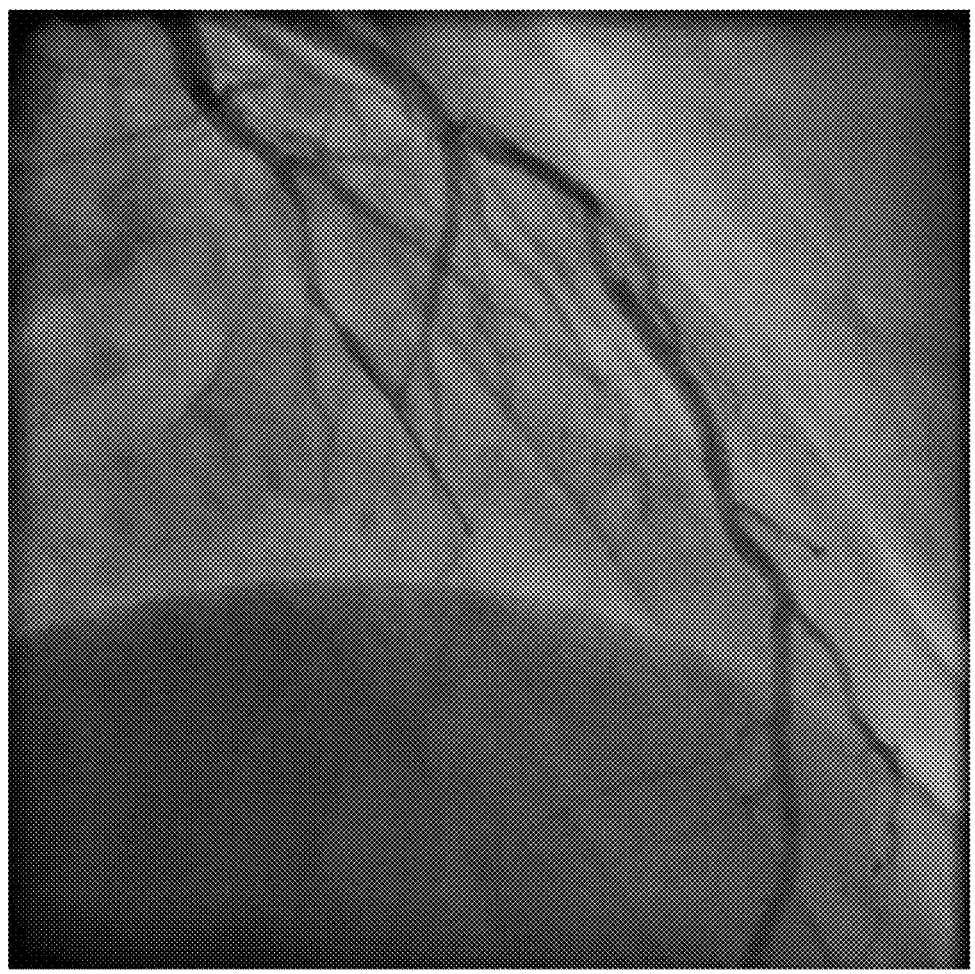
FIG. 3 shows an angiographic image that does not contain the entire coronary tree due to the FOV.

In the 2D angiographic images for instance the carina positon of a bifurcation might not be unambiguously visible as shown in FIG. 1. In the 3D model the exact location of the carina is however known. This information can be used to adjust the 3D reconstruction, for instance by correcting the centerline position of the bifurcated artery.

Furthermore, if vessels are overlapping, the corresponding diameters and centerlines in the 2D reconstruction can be incorrect. By incorporating a back projected centerline of the 3D model for the overlapping part a more accurate 3D centerline reconstruction can be made and by incorporating the diameters they can be corrected as well.

Also, the structure of the vessel at a certain position can be fairly complex. For instance, when a severe stenosis or a total occlusion is present.

Figure 5:
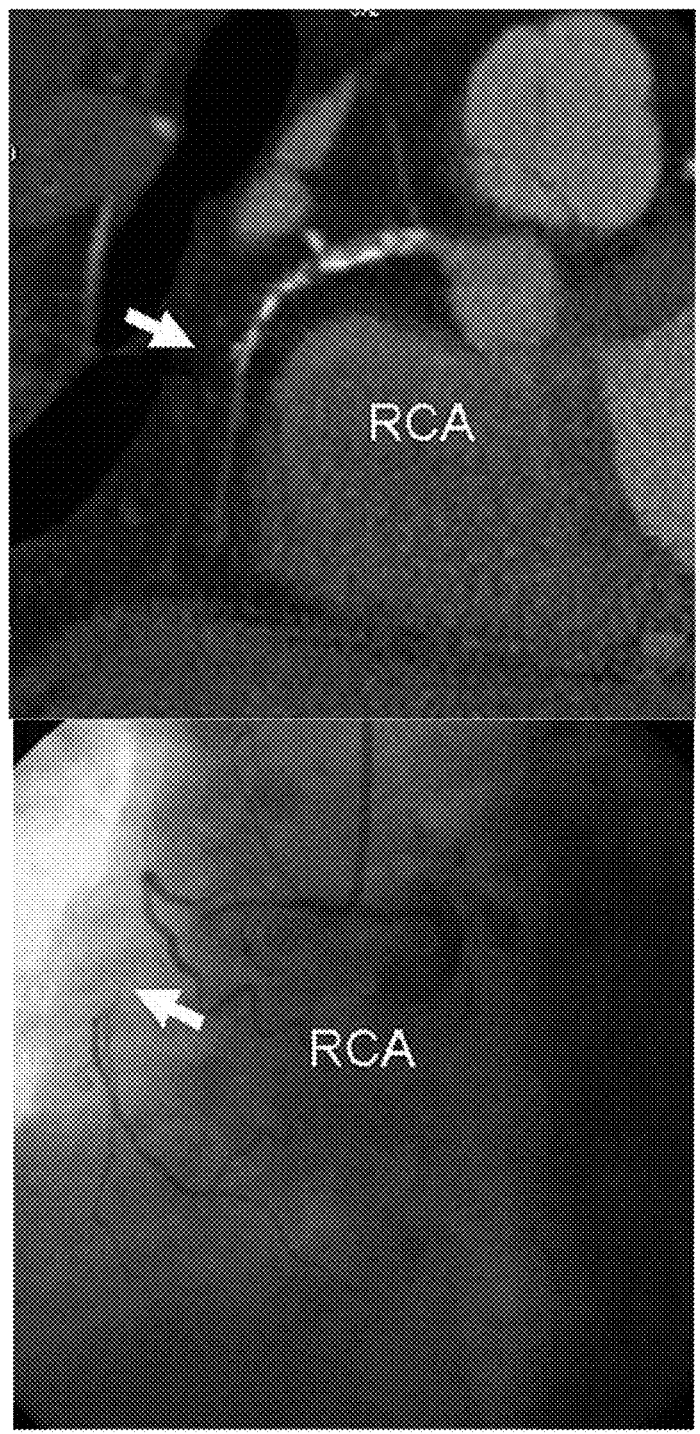
FIG. 5 shows a total occlusion of a section of the right coronary artery in a CT dataset (top) as well as in an angiographic image (bottom).

In the case where a total occlusion is present as shown in FIG. 5, 2D angiographic images cannot provide any information in this section of the vessel. As no blood is flowing through this total occlusion, contrast agent cannot be used to visualize the occluded segment during angiography as described for instance by Freed et al, "Chronic Total Occlusion", Manual of Interventional Cardiology, pp 287-299, Physicians Press 2001, herein incorporated by reference in its entirety. This results in information loss in the 3D reconstruction based on the 2D angiographic images. However, information regarding the total occlusion is present in the 3D CT data.

When a severe stenosis is present, little blood flow is possible in this section of the vessel. Therefore, the 2D angiographic images will contain little information regarding this section of the vessel. This can lead to a misrepresentation of this section of the vessel. The 3D model derived from the CT data can be used to provide extra information regarding this stenosis.

For these complex structures for instance a lumen segmentation of the 3D data can be used to adjust the shape of the 3D reconstruction at the position of the total occlusion. Another possibility is the use of the centerline segmentation of the 3D model to adjust the centerline of the 3D reconstruction at the position of the total occlusion.

The above mentioned improvements can be done in 2D by back projecting the 3D model onto the 2D angiographic images as described earlier or directly in 3D. That is information of the 3D model can be used to directly improve the 3D reconstruction. In order to do so a link between the 3D model and the 3D reconstruction has to be established. This can be done for instance as taught by Jian et al, "Robust point set registration using Gaussian mixture models", IEEE Trans. Pattern Anal. Match. Intell. 33(8), 1633-1645 (2011), herein incorporated by reference in its entirety.

Also when establishing a match between the 3D model and either the 2D angiographic images or the 3D reconstruction information regarding foreshortening and overlap that is available from the 3D model can be used. It is likely that these regions will account for a local mismatch. By applying a weighting function to these regions, the matching process can be facilitated.

Once an accurate 3D reconstruction of the coronary artery is available, the data processing module can propagate the 3D reconstruction over time to obtain a 3D+time reconstruction. This can also be done either in 2D or in 3D.

By propagating the 3D reconstruction, the information of the first 3D reconstruction is used to make the other 3D reconstructions. Because the first 3D reconstruction is made using the most optimal projections, the best available information from X-ray combined with the information gathered from the 3D volume data is used for the 3D reconstruction. For each frame of the 2D angiographic image the previous reconstruction is used as input for generating a 3D reconstruction in another point of time. To do this, different methods can be used, being rigid and non-rigid transformations of the previous 3D reconstruction, to transform the 3D reconstruction to a correct 3D reconstruction of another point in time as taught for instance by Shechter et al, "Three-Dimensional Motion Tracking of Coronary Arteries in Biplane Cineangiograms", IEEE Transactions on Medical Imaging, Vol 22, No 4, April 2003, herein incorporated by reference in its entirety.

When performing this propagation step multiple times, a 3D+time reconstruction is created which, when covering a complete heartbeat, reflects the movement of a section of the coronary tree throughout the cardiac cycle Also an average motion model can be derived as described in Baka et al, "Statistical coronary motion models for 2D+t/3D registration of X-ray coronary angiography and CTA", Medical Image Analysis 17(2013) pp 698-709, herein incorporated by reference in its entirety. This motion model can be used to help improve the 3D+t reconstruction. Because the motion is known between two time moments, this information can be used to estimate the initial offset between two 3D reconstructions, facilitating the propagation of the 3D reconstruction over time. As mentioned before, this information is important for the clinician as it helps provide a good understanding of the motion of the vessel of interest.

Also this movement information combined with the perspective information of the 2D angiographic images can improve the 3D+time reconstruction in any heart phase when for instance a segment of the vessel foreshortens significantly over time or due to movement a significant overlap of surroundings vessels occurs later on in the heart cycle.

The advantage of this is that the clinician has information about the position of the whole or a large section of the coronary tree over time. Especially when dealing with coronary arteries this is of great importance. This information can help the clinician achieve a good understanding of the arteries and guide the clinician during the intervention without the need for constant contrast admission. Therefore, reducing the burden for the patient.

Optionally a 4D CT dataset is available of the patient. A 4D CT dataset is a continuous recording of multiple 3D CT recordings during the cardiac cycle. Because a 3D model is available for every heart phase, every 3D reconstruction over time can be improved in all available image data within one cardiac cycle.

Optionally the 3D+time reconstruction can be used to provide a dynamic overlay of the coronary tree in any desired orientation.

Figure 7:
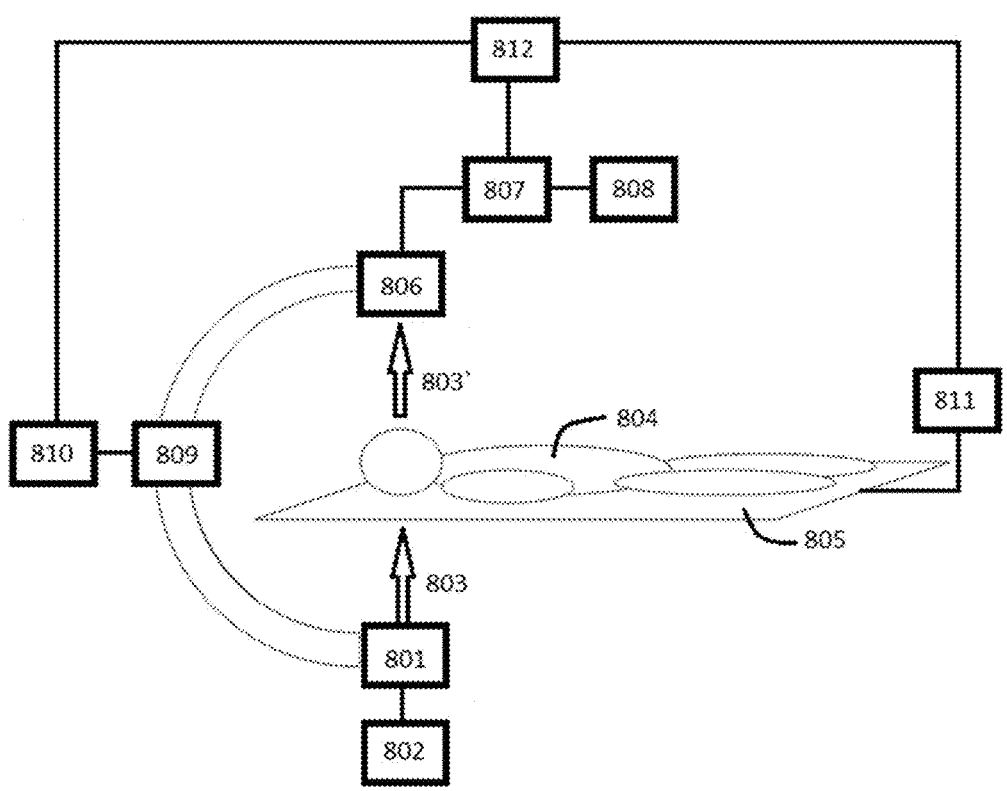
FIG. 7 shows an example of x-ray cinefluorographic unit block diagram.

Operations can be performed by processor unit on a standalone system or included directly in, for instance, an X-ray fluorography system or any other image system to acquire two dimensional angiographic images. FIG. 7 illustrates an example of a high-level block diagram of an x-ray cinefluorograpic system. In this block diagram an example is shown on how embodiments could integrate in such a system.

Portions of the system (as defined by various functional blocks) may be implemented with dedicated hardware, analog and/or digital circuitry, and/or one or more processors operating program instructions stored in memory.

The X-ray system of FIG. 7 includes an X-ray tubes 801 with a high voltage generator 802 that generates an X-ray beam 803.

The high voltage generator 802 controls and delivers power to the X-ray tube 801. The high voltage generator 802 applies a high voltage across the vacuum gap between the cathode and the rotating anode of the X-ray tube 801.

Due to the voltage applied to the X-ray tube 801, electron transfer occurs from the cathode to the anode of the X-ray tube 801 resulting in X-ray photon-generating effect also called Bremsstrahlung. The generated photons form an X-ray beam 803 directed to the image detector 806.

An X-ray beam 803 consists of photons with a spectrum of energies that range up to a maximum determined by among others the voltage and current submitted to the X-ray tube 801.

The X-ray beam 803 then passes through the patient 804 that lies on an adjustable table 805. The X-ray photons of the X-ray beam 803 penetrate the tissue of the patient to a varying degree. Different structures in the patient 804 absorb different fractions of the radiation, modulating the beam intensity.

The modulated X-ray beam 803' that exits from the patient 804 is detected by the image detector 806 that is located opposite of the X-ray tube. This image detector 806 can either be an indirect or a direct detection system.

In case of an indirect detection system, the image detector 806 consists of a vacuum tube (the X-ray image intensifier) that converts the X-ray exit beam 803' into an amplified visible light image. This amplified visible light image is then transmitted to a visible light image receptor such as a digital video camera for image display and recording. This results in a digital image signal.

In case of a direct detection system, the image detector 806 consists of a flat panel detector. The flat panel detector directly converts the X-ray exit beam 803' into a digital image signal.

The digital image signal resulting from the image detector 806 is passed through a digital image processing unit 807. The digital image processing unit 807 converts the digital image signal from 806 into a corrected X-ray image (for instance inverted and/or contrast enhanced) in a standard image file format for instance DICOM. The corrected X-ray image can then be stored on a hard drive 808.

Furthermore, the X-ray system of FIG. 7 consists of a C-arm 809. The C-arm holds the X-ray tube 801 and the image detector 806 in such a manner that the patient 804 and the adjustable table 805 lie between the X-ray tube 801 and the image detector 806. The C-arm can be moved (rotated and angulated) to a desired position to acquire a certain projection in a controlled manner using the C-arm control 810. The C-arm control allows for manual or automatic input for adjustment of the C-arm in the desired position for the X-ray recording at a certain projection.

The X-ray system of FIG. 7 can either be a single plane or a bi-plane imaging system. In case of a bi-plane imaging system, multiple C-arms 809 are present each consisting of an X-ray tube 801, an image detector 806 and a C-arm control 810.

Additionally, the adjustable table 805 can be moved using the table control 811. The adjustable table 805 can be moved along the x, y and z axis as well as tilted around a certain point.

A general unit 812 is also present in the X-ray system. This general unit 812 can be used to interact with the C-arm control 810, the table control 811 and the digital image processing unit 807.

An embodiment is implemented by the X-ray system of FIG. 7 as follows. A clinician or other user acquires at least two X-ray angiographic image sequences of a patient 804 at a certain projection by using the C-arm control 810 to move the C-arm 809 to a desired position relative to the patient 804. The patient 804 lies on the adjustable table 805 that has been moved by the user to a certain position using the table control 811.

Each X-ray image sequence is generated using the high voltage generator 802, the X-ray tube 801, the image detector 806 and the digital image processing unit 807 as described above. This image sequences are stored on the hard drive 808. Using the X-ray image sequences, the general processing unit 812 calculates a 3D reconstruction and optimize this 3D reconstruction by use of the 3D model which can be retrieved for instance from a PACS. Next the general processing unit 812 calculated a 3D+time reconstruction from the X-ray image sequence stored on the hard drive 808 and the optimize 3D model.

There have been described and illustrated herein several embodiments of a method and apparatus for determining optimal image viewing direction in terms of reduced foreshortening and relevancy of information. While particular embodiments of the invention have been described, it is not intended that the invention be limited thereto, as it is intended that the invention be as broad in scope as the art will allow and that the specification be read likewise. For example, the data processing operations can be performed offline on images stored in digital storage, such as a picture archiving and communication system (PACS) commonly used in the medical imaging arts. It will therefore be appreciated by those skilled in the art that yet other modifications could be made to the provided invention without deviating from its spirit and scope as claimed.

The embodiments described herein may include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Various embodiments may further include receiving, sending, or storing instructions and/or data implemented in accordance with the foregoing description upon a computer-readable medium. Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A method for making a three-dimensional surface reconstruction of an object, comprising:
    a) providing or acquiring a three-dimensional dataset of the object acquired using a three-dimensional imaging modality;
    b) generating a three-dimensional model of the object using the three-dimensional dataset of the object of a);
    c) providing or acquiring at least two bi-dimensional angiographic images of the object acquired using a bi-dimensional X-ray imaging modality different from the three-dimensional imaging modality of a);
    d) generating a three-dimensional reconstruction of the object from the at least two bi-dimensional angiographic images of the object of c) and the three-dimensional model of the object of b);
    e) determining motion information of the object; and
    f) propagating the three-dimensional reconstruction of the object of d) based on the motion information of the object of e) to build a three-dimensional reconstruction of the object over time.

2. A method according to claim 1, wherein:
    the three-dimensional dataset of the object of a) is part of a four-dimensional dataset.

3. A method according to claim 1, wherein:
    the motion information of the object of e) is determined through an average motion model of the object.

4. A method according to claim 1, wherein:
the three-dimensional reconstruction of the object of d) is based upon geometrical information obtained from the three-dimensional model of the object of b).

5. A method according to claim 4, wherein:
the object is a vessel or a tree of vessels; and
said geometrical information comprises diameters, centerlines, stenosis or the like.

6. A method according to claim 1, further comprising:
determining a segment of interest, wherein the three-dimensional reconstruction of the object of d) is limited to such segment of interest or part thereof.

7. A method according to claim 6, wherein:
the segment of interest is determined based on at least one of the bi-dimensional angiographic images of the object of c).

8. A method according to claim 7, wherein:
the three-dimensional model of the object of b) is used to determine the segment of interest in at least one of the bi-dimensional angiographic images of the object of c) either automatically or semi-automatically.

9. A method according to claim 1, further comprising:
modifying the three-dimensional model of the object of b) based on motion information of the object to build a three-dimensional model of the object over time; and
performing calculations on the three-dimensional model of the object over time to identify the first optimal projection perspective.

10. A method according to claim 1, wherein:
the at least two bi-dimensional angiographic images of the object of c) include a bi-dimensional angiographic image of the object obtained at a first optimal projection perspective.

11. A method according to claim 10, wherein:
the at least two bi-dimensional angiographic images of the object of c) include another bi-dimensional angiographic image of the object obtained at a second optimal projection perspective.

12. A method according to claim 11, wherein:
the second optimal projection perspective is orthogonal to the first optimal projection perspective.

13. A method according to claim 11, wherein:
multiple bi-dimensional angiographic images of the object are obtained from the first and second optimal projection perspectives in different instants of time to build the three-dimensional reconstruction of the object over time of f).

14. A method according to claim 10, further comprising:
determining a color map showing the degree of foreshortening and/or overlap of surrounding vessels and/or in-plane coronary motion.

15. A method according to claim 14, wherein:
the first optimal projection perspective is identified by a user interacting with such color map.

16. A method according to claim 10, wherein:
the first optimal projection perspective is dependent on minimizing at least one of foreshortening, overlap of surrounding vessels and in-plane motion.

17. A method according to claim 16, wherein:
the first optimal projection perspective is dependent on a weighted sum of foreshortening, overlap of surrounding vessels and in-plane motion.

18. A method according to claim 1, wherein:
the three-dimensional reconstruction of the object over time of) is based on multiple bi-dimensional angiographic images of the object obtained from first and second optimal projection perspectives over time.

19. A method according to claim 1, wherein:
the three-dimensional reconstruction of the object over time of f) provides a dynamic overlay of the coronary tree.

20. A method according to claim 1, wherein:
the three-dimensional imaging modality of a) is selected from the group consisting of a Computed Tomography (CT) imaging modality and a Magnetic Resonance (MR) imaging modality.

21. A non-transitory computer product directly loadable into the memory of a digital computer and comprising software code portions for performing the method according to claim 1 when the computer product is run on a computer.

22. An X-ray imaging device that includes a module for acquiring two dimensional angiographic images of an object, an input for receiving a three-dimensional dataset of the object acquired using a three-dimensional imaging modality different from the X-ray imaging device, and a processor programmed for
   a) generating a three-dimensional model of the object using the three-dimensional dataset of the object as received by the input of the X-ray imaging device;
   b) generating a three-dimensional reconstruction of the object based on at least two two-dimensional angiographic images of the object acquired by the module of the X-ray imaging device and the three-dimensional model of the object of a);
   c) determining motion information of the object and
   d) propagating the three-dimensional reconstruction of the object of b) based on the motion information of the object of c) to build a three-dimensional reconstruction of the object over time.

23. An X-ray imaging device according to claim 22, further comprising:
a unit configured to process the three-dimensional dataset of the object to determine rotational and angulation position of such X-ray imaging device to acquire two-dimensional angiographic images of the object from optimal perspectives to generate the three-dimensional reconstruction of the object.

* * * * *